United States Patent Office 3,329,582
Patented July 4, 1967

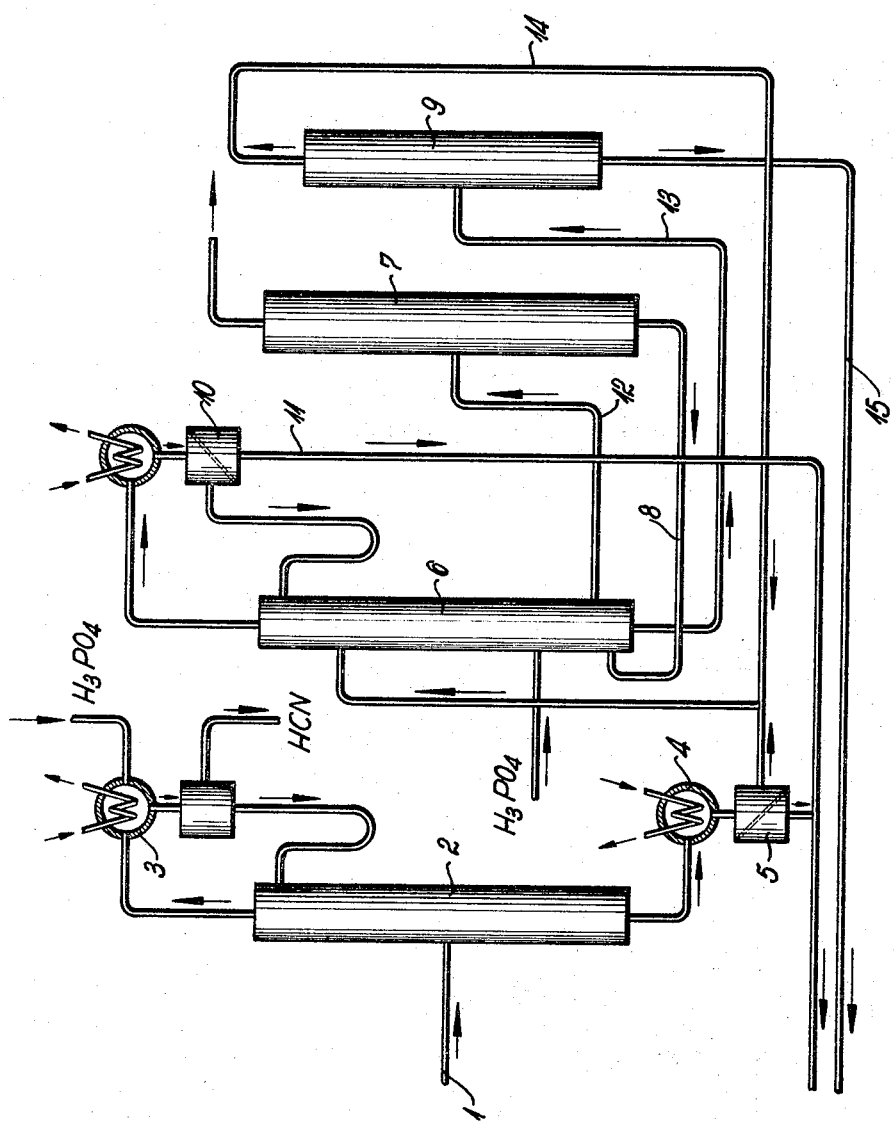

3,329,582
PROCESS FOR SEPARATING ACRYLONITRILE AND HYDROCYANIC ACID FROM MIXTURES BY DISTILLATION WITH PHENOTHIAZINE AND PHOSPHORIC ACID
Kurt Sennewald and Wilhelm Vogt, Knapsack, and Heinz Erpenbach, Surth, near Cologne, Germany, assignors to Knapsack-Griesheim Aktiengesellschaft, Knapsack, Germany, a corporation of Germany
Filed Jan. 14, 1964, Ser. No. 338,283
Claims priority, application Germany, Jan. 16, 1963, K 48,710
4 Claims. (Cl. 203—6)

The present invention relates to a process for recovering pure acrylonitrile and pure hydrocyanic acid by distillation from a crude acrylonitrile mixture which also contains acrolein, acrolein-cyanohydrin and water as by-products.

It has already been described to prepare acrylonitrile by reacting propylene or acrolein with ammonia and molecular oxygen in the gaseous phase in the presence of a catalyst. The catalyst used in this process include the following metals or their oxides, which are used alone or in combination and optionally in combination with phosphoric acid: thorium, molybdenum, vanadium, tin, chromium, tungsten, cobalt, iron, manganese, nickel, copper, bismuth, titanium, zinc, cadmium, silver, gold, lead, niobium, tantalum, uranium and cerium. In such reactions, the crude acrylonitrile and the hydrocyanic acid formed during the process are generally obtained in the form of an aqueous solution by washing the gaseous reaction products, preferably after neutralization of unreacted ammonia, for example with dilute sulfuric acid, with an appropriate solvent, for example water. The aqueous solution so produced is treated in conventional manner in a stripping column, which is preferably combined with an appropriate extraction means, to separate the bulk of the water as the still product with the resultant formation of an acrylonitrile/hydrocyanic acid mixture as the head product which apart from water contains as by-products varying amounts of unreacted or formed acrolein and acrolein-cyanohydrin obtained by cyanohydrin synthesis from hydrocyanic acid and acrolein.

Heretofore, it has not been possible to completely remove the by-products or contaminants from the acrylonitrile and the hydrocyanic acid by fractional distillation. More especially, it has been rather difficult to isolate pure acrylonitrile since the acrolein-cyanohydrin remaining as contaminant in the crude acrylonitrile after separation of the hydrocyanic acid is decomposed again on distilling the acrylonitrile into hydrocyanic acid and aldehyde, which then appear in the distillate.

The present invention unexpectedly provides a process which obviates the difficulties mentioned above and enables acrylonitrile to be obtained having a purity sufficient for making perfect acryolnitrile polymers.

It has been found that mixtures of acrylonitrile with hydrocyanic acid which contain an amount of water corresponding to its solubility and also contain acrolein and acrolein-cyanohydrin as contaminants, briefly called hereinafter "crude acrylonitrile" can be purified in reliable manner by stabilizing the crude acrylonitrile with about 0.1 to 5 weight parts per thousand phenothiazine, then distilling it in a first column and removing pure hydrocyanic acid at the top portion of the column. The material refluxed in this column is admixed with about 0.1 to 5 weight parts per thousand phosphoric acid thus fixing the state of reaction reached "acrolein+hydrocyanic acid→acrolein-cyanohydrin" and obviating a reverse reaction. The product obtained in the bottom portion of the first column, which decomposes into two phases, is separated from its aqueous layer and then supplied to a second column, wherein the acrylonitrile is dehydrated and water and the acrolein as contaminant are obtained as the head products. The dehydrated acrylonitrile is again admixed in the lower portion of the second column with 0.05 to 1 weight part per thousand phosphoric acid so as to stabilize the acrolein-cyanohydrin, removed at the lowest tray in the column and freed from residual acrolein-cyanohydrin by distillation in a third column.

The product obtained in the still portion of the third column is return to the second column in which in addition to acrylonitrile the acrolein-cyanohydrin is concentrated to an extent of up to 45% by weight.

When this concentration is reached, the sump product in the second column is withdrawn and introduced into a thin layer evaporator operated under reduced pressure and separated therein into acrylonitrile and acrolein-cyanohydrin. The acrylonitrile is returned to the second column, whereas the acrolein-cyanohydrin can be transformed into further acrylonitrile and hydrocyanic acid by the process described in patent application Ser. No. 305,366.

More particularly, the present invention is concerned with a process for separating acryontrile and hydrocyanic acid from a crude acrylonitrile mixture containing hydrocyanic acid, acrolein, acrolein-cyanohydrin and water by distillation, wherein pure hydrocyanic acid is distilled off at atmospheric pressure at the top portion of a first distilling column from crude acrylonitrile stabilized with phenothiazine and phosphoric acid, whereas the product obtained in the sump portion of the first distilling column is first cooled and then separated in a separating zone into two phases, the aqueous phase thereof is removed, the acrylonitrile-containing phase is introduced into a second distilling column operated under reduced pressure, in which a mixture, which after cooling separates into two phases is distilled off, of which the lower aqueous phase containing the bulk of the acrolein is withdrawn, whereas the acrylonitrile containing phase is returned to the second distilling stage, a dehydrated vapor-liquid mixture consisting of acrylonitrile and about 1% by weight acrolein-cyanohydrin is withdrawn over the sump portion of the second distilling stage and introduced into a third distilling stage.

The lower aqueous phases removed in the two phase-separating steps should advantageously be caused to travel to an expelling zone connected in series with the first distilling stage, in which expelling stage the crude acrylonitrile mixture is recovered from the dilute, aqueous solution by stripping it in conventional manner, preferably by extractive distillation.

The second distilling stage is preferably maintained at a pressure of about 400 mm. mercury, a temperature of about 75° C. in its sump portion and of about 55° C. in its tip portion. Additional anhydrous phosphoric acid may be introduced for stabilization at a location disposed at about half the height of the second distilling stage.

In the third distilling stage, pure acrylonitrile is obtained under reduced pressure as the head product, whereas the sump product containing acrylonitrile and acrolein-cyanohydrin is continuously returned to the second distilling stage.

Generally, the sump product obtained in the second distilling stage is continuously removed therefrom with a composition of about 45% by weight acrolein-cyanohydrin and 55% by weight acrylonitrile and passed over a thin layer evaporator, in which the sump product is separated under reduced pressure into a head product portion containing about 93% by weight acrylonitrile and 7% by weight acrolein-cyanohydrin which is returned to the second distilling stage, and into a sump product portion containing about 7% by weight acrylonitrile and 93% by weight acrolein-cyanohydrin which is withdrawn and utilized for other purposes.

The third distilling stage is preferably maintained at a pressure of about 350 mm. mercury, a sump temperature of about 65° C. and a head temperature of about 52°C.

The flow scheme in the accompanying drawing illustrates one mode of executing the process of the present invention with reference to the following example:

A mixture consisting of propylene, ammonia and air was passed at an elevated temperature over a catalyst so as to prepare acrylonitrile in the gaseous phase. The resultant reaction gas containing acrylonitrile, hydrocyanic acid and acrolein in the ratio by weight of 33:6.2:1 was neutralized with dilute sulfuric acid so as to remove the ammonia at a temperature of 90° C., at which the above three components are not yet absorbed, and then washed with water with the resultant formation of an aqueous solution containing 2% by weight acrylonitrile. The aqueous solution so obtained was subjected to extractive distillation in conventional manner in a stripping column to recover the crude acrylonitrile composed of 75.6% acrylonitrile, 13.6% hydrocyanic acid, 1.0% acrolein, 1.9% acrolein-cyanohydrin and 7.9% water. It was stabilized with 1 part by weight phenothiazine per 1000 parts crude acrylonitrile so as to avoid acrylonitrile and acrolein polymerization and supplied through line 1 to the 21st tray of column I (2) comprising 32 trays. In order to stabilize the hydrocyanic acid and to avoid decomposition of the acrolein-cyanohydrin, the whole was admixed through cooler 3 with 1.4 parts by weight pure phosphoric acid per 1000 parts by weight crude acrylonitrile. Hydrocyanic acid of more than 99% strength was withdrawn at atmospheric pressure from the top portion of column I (2) at a temperature of 72° C. in the still portion and of 27° C. in the top portion of the column and at a reflux ratio of 2:1. The sump product in column I (2) was conveyed via cooler 4 to separating vessel 5 in which it was separated into two phases due to the changed solubility of the water resulting from the removal of the hydrocyanic acid by distillation. The lower aqueous phase was introduced through line 11 into the stripping column, which simultaneously served for extractive distillation, and the upper phase containing acrylonitrile was supplied to column II (6). This latter phase consisted of 92.6% acrylonitrile, 1.2% acrolein, 2.3% acrolein-cyanohydrin and 3.9% water. It was introduced at the 28th tray of column II (6) comprising altogether 31 trays. At the top portion of this column, the acrolein contained in the intake product was obtained as the distillate in addition to the acrylonitrile/water azeotrope which separated into two phases in separating vessel 10. The lower aqueous phase thereof, which contained the bulk of the acrolein, was refluxed through line 11 to the stripping column, whereas the upper phase containing the acrylonitrile was returned through a siphon to column II (6). The upper refluxed phase and the aqueous phase which was removed, were in the ratio by volume of 45:1. The temperatures of 75° C. in the sump portion and of 55° C. in the top portion of the column maintained under a pressure of 400 mm. mercury were kept within narrow limits since the acrolein-cyanohydrin starts decomposing at an elevated temperature (more than 85° C.). In order to avoid the decomposition of cyanohydrin, an additional minor amount of pure phosphoric acid was added at the 17th tray of column II (6), i.e. 0.1 part by weight 100% phosphoric acid per 1000 parts by weight product introduced into column II. Dehydrated acrylonitrile was removed in the form of a vapor-liquid mixture with a 99% acrylonitrile and a 1% acrolein cyanohydrin concentration at the lowest tray of column II (6) and supplied through line 12 to the 11th tray of purifying column III (7) comprising 23 trays. In column III (7), pure acrylonitrile was obtained as the distillate at distillation temperatures of 65° C. in the still and 52° C. in the top portion of the column, a pressure of 350 mm. mercury and a reflux ratio of 1:1. The product obtained in the sump portion of column III (7), which was composed of 25% by weight acrolein-cyanohydrin and 75% by weight acrylonitrile, was continuously removed and introduced through line 8 into column II (6). The product obtained in the still portion of column II (6), which contained 45% by weight acrolein-cyanohydrin and 55% by weight acrylonitrile was conveyed in continuous manner through line 13 to a thin layer evaporator 9 in which it was separated at a temperature of 80° C. and a pressure of 200 mm. mercury into a head product containing 93% by weight acrylonitrile and 7% by weight acrolein-cyanohydrin, which traveled through line 14 into column II (6), and into a still product containing 7% by weight acrylonitrile and 93% by weight acrolein-cyanohydrin, which could be introduced through line 15 into the reactor fed with propylene ammonia and air.

The acrylonitrile obtained by the process of the present invention could be polymerized and copolymerized in reliable manner. It contained 99.9% acrylonitrile and trace contaminants so as to meet all conventional specifications as to purity.

We claim:

1. A process for separating acrylonitrile and hydrocyanic acid from a crude acrylonitrile mixture containing hydrocyanic acid, acrolein, acrolein-cyanohydrin and water which comprises: stabilizing the crude acrylonitrile mixture with phenothiazine and phosphoric acid; distilling it at atmospheric pressure in a first distilling stage so as to remove pure hydrocyanic acid at the top portion of the said distilling stage; cooling the product obtained in the still portion of the said distilling stage and separating it in a first separating zone into an aqueous phase and an acrylonitrile-containing phase; withdrawing the said aqueous phase and conveying the said acrylonitrile-containing phase to a second distilling stage operated under reduced pressure; distilling the said acrylonitrile-containing phase in the said second distilling stage so as to remove at its top portion a mixture which after cooling separates in a second separating zone into a second aqueous phase containing the bulk of the acrolein and a second acrylonitrile-containing phase; withdrawing the said second aqueous phase and refluxing the said second acrylonitrile-containing phase to the said second distilling stage; removing a dehydrated vapor-liquid mixture consisting of acrylonitrile and about 1% by weight of acrolein-cyanohydrin at the lowest tray of the said second distilling stage and conveying the said dehydrated vapor-liquid mixture to a third distilling stage; withdrawing pure acrylonitrile under reduced pressure at the top portion of the said third distilling stage and continuously refluxing the product consisting of acrylonitrile and acrolein-cyanohydrin obtained in the still portion of the said third distilling stage into the said second distilling stage and continuously removing the product obtained in the still portion of the second distilling stage composed of about 45% by weight acroleincyanohydrin and about 55% by weight acrylonitrile and passing it through a thin layer evaporator, in which the said product is separated under reduced pressure into a head product portion consisting of about 93% by weight acrylonitrile and 7% by weight acroleincyanohydrin, which is refluxed into the second distilling stage, and into a still product portion consisting of about 7% by weight acrylonitrile and 93% by weight acrolein-cyanohydrin which is withdrawn.

2. A process as claimed in claim 1, wherein the second distilling stage is maintained at a pressure of about 400 mm. mercury, a temperature of about 75° C. in its still portion and a temperature of about 55° C. in its top portion.

3. A process as claimed in claim 1, wherein an additional amount of phosphoric acid is introduced for stabilization into the second distilling stage at a location disposed at about half the height of the said second distilling stage.

4. The process of claim 1, wherein the third distilling stage is maintained at a pressure of about 350 mm. mercury, a temperature of about 65° C. in its still portion and a temperature of about 52° C. in its top portion.

References Cited

UNITED STATES PATENTS

| | | | |
|---|---|---|---|
| 2,836,614 | 5/1958 | Bewley | 203—6 |
| 3,051,630 | 8/1962 | Hadley et al. | 260—465.9 |
| 3,073,753 | 1/1963 | Hadley et al. | 260—465.9 |

FOREIGN PATENTS

| | | |
|---|---|---|
| 949,405 | 2/1949 | France. |

NORMAN YUDKOFF, *Primary Examiner.*

W. L. BASCOMB, JR., *Assistant Examiner.*